United States Patent [19]

Imamiya et al.

[11] Patent Number: 5,223,060
[45] Date of Patent: Jun. 29, 1993

[54] PNEUMATIC RADIAL TIRE INCLUDING STEEL CORDS OF FLAT OBLONG CROSS-SECTIONAL CONFIGURATION

[75] Inventors: Susumu Imamiya; Yukio Tozawa, both of Hiratsuka, Japan

[73] Assignee: The Yokohama Rubber Co., Ltd., Tokyo, Japan

[21] Appl. No.: 928,095

[22] Filed: Aug. 13, 1992

Related U.S. Application Data

[63] Continuation of Ser. No. 426,544, Oct. 26, 1989, abandoned.

[30] Foreign Application Priority Data

Oct. 26, 1988 [JP] Japan .................. 63-268147

[51] Int. Cl.$^5$ .................. B60C 9/18; B60C 9/20; B60C 9/00
[52] U.S. Cl. .................. 152/451; 57/200; 57/311; 57/902; 152/527
[58] Field of Search .................. 152/451, 527, 556; 57/902, 200, 215, 219, 311

[56] References Cited

U.S. PATENT DOCUMENTS

| | | | |
|---|---|---|---|
| 4,258,543 | 3/1981 | Canevari et al. | 152/451 X |
| 4,333,306 | 6/1982 | Yamashita et al. | 152/451 X |
| 4,399,853 | 8/1983 | Morimoto et al. | 152/359 |
| 4,718,470 | 1/1988 | Kusakabe et al. | 152/451 |
| 4,836,262 | 6/1989 | Nishizawa et al. | 152/451 |
| 4,850,412 | 7/1989 | Gupta | 152/556 |
| 4,938,015 | 7/1990 | Kinoshita | 152/556 X |
| 5,162,067 | 11/1992 | Miyawaki | 152/451 |

FOREIGN PATENT DOCUMENTS

| | | | |
|---|---|---|---|
| 59-156805 | 9/1984 | Japan | 152/527 |
| 61-108397 | 7/1986 | Japan | 152/451 |
| 62-282923 | 12/1987 | Japan | 152/527 |

*Primary Examiner*—Michael W. Ball
*Assistant Examiner*—Adrienne C. Johnstone
*Attorney, Agent, or Firm*—Finnegan, Henderson, Farabow, Garrett & Dunner

[57] ABSTRACT

A pneumatic radial tire containing a steel cord/rubber composite reinforcement structure wherein the steel cord comprises a plurality of steel filaments embedded in a rubber layer. The steel cord made up of the filaments is flattened out in the form of a generally cross-sectionally flat, oblong, elongated strip having a specified dimensional parameter such that the filaments in the resulting reinforcement are held out of contact with each other and the overall dimensions of the flat cord are uniform throughout the length thereof 3 Claims, 2 Drawing Sheets

PNEUMATIC RADIAL TIRE INCLUDING STEEL CORDS OF FLAT OBLONG CROSS-SECTIONAL CONFIGURATION

This application is a continuation, of application Ser. No. 07/426,544, filed Oct. 26, 1989, now abandoned.

BACKGROUND OF THE INVENTION

1. Field of the Invention

This invention relates to pneumatic radial tires for motor vehicles having a steel cord reinforced structure and a process of far producing the steel cord reinforced structure.

2. Prior Art

Advanced pneumatic radial-ply tires for passenger cars are provided typically with belt layers made up of rubber coated steel cords. Organic fiber cords have also found wide application for the belt portion of the radial tire but have mostly been accompanied with the use of rubber coated steel cords at least for one belt layer to provide increased rigidity.

While steel cords are suitable for use as belt reinforcement material in view of their high rigidity and strength, the cords being steel are susceptible to corrosion attack by water permeating through an external injury in the tire which would lead to separation from the rubber coating in which the cords are embedded and thus pose a durability problem. To solve this problem, there has been proposed an open-twisted type steel cord as disclosed for example in U.S. Pat. Nos. 4,399,853 and 4,718,470 which comprises a 1×n strand construction such as 1×5, 1×4 and 1×3 having filament-to-filament spaces filled with rubber. This steel cord structure is characterized by non-uniformity of the cross-sectional shape distribution over the entire length of the cord. FIG. 3 in the accompanying drawings illustrates a typical example of the prior art in which an open-twisted cord is formed with a group of steel filaments all isolated or spaced apart from each other and another group of steel filaments some of which are isolated from one another and the others held partly in physical contact with each other, the two groups alternating one with another over the length of the cord.

Another prior art example is directed to a composite metal and rubber material having a plurality of different cross-sectional shapes for the metal cord. Both prior art cord systems have a common feature of a cross-sectional shape distribution being irregular throughout the length of the cord or in its axial direction. This has a drawback in that strains resulting from compressive deformation of the tire on running tend to be localised inducing a fracture or breakage of the cord.

SUMMARY OF THE INVENTION

With a view to overcoming the foregoing drawback of the prior art, i.e. to eliminating inter alia possible tire failures arising from compressive deformation, the present invention seeks to provide a pneumatic radial tire incorporating a steel cord/rubber composite reinforcement which is made up from a plurality of steel filaments arranged in space apart or isolated relation and embedded in at least in one rubber coating layer.

More specifically, the invention provides a pneumatic radial tire having a steel cord/rubber reinforcement in which the cross-section of the cord taken perpendicularly across is substantially uniform in diameter throughout the length of the cord.

According to the invention, there is provided a pneumatic radial tire for motor vehicles which incorporates a steel cord/rubber composite reinforcement comprising a plurality of steel filaments constituting the cord arranged in spaced-apart or isolated relation to one another and embedded in at least one rubber coating layer, the cord having a flat oblong cross-sectional configuration with its dimensional distribution being uniform throughout the length thereof, and the ratio of its narrow or smaller dimension to its wide or larger dimension being in the range of 0.65–0.87.

A process for producing a steel cord/rubber composite reinforcement according to the invention comprises compressing a plurality of twisted steel filaments into a flat strip constituting the cord, applying a rubber coating to said flat strip and subsequently vulcanizing said rubber to produce a composite reinforcement the cord having a ratio between its narrow or small diameter portion to its wide or larger diameter in the range of 0.65–0.87 which ratio is uniform throughout the length of the cord and in which said steel filaments are held in spaced-apart or isolated relation to one another.

The reinforcement layer according to the invention may be suitably applied to pneumatic radial tire components such as a carcass between a pair of opposed beads, an annular belt between a carcass and a tread as well as bead portions.

The pneumatic radial tire of the invention may be used successfully for both passenger cars and heavy duty vehicles.

The invention will be described in detail with reference to the accompanying drawings which illustrate by way of example a preferred embodiment.

DETAILED DESCRIPTION OF THE PREFERRED EMBODIMENTS

A steel cord 10 according to the invention comprises a plurality of steel filaments 11 numbering preferably from three to five of a 1×n strand construction having a twisting pitch preferably in the range of 7 mm–18 mm.

Figure 1A:
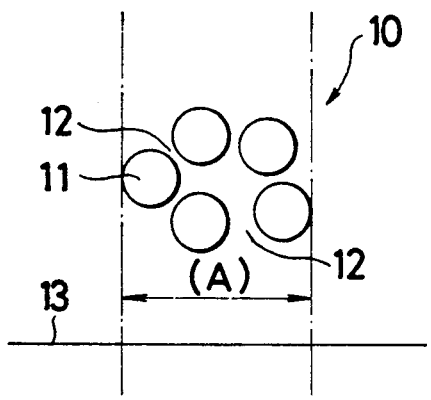
FIG. 1a is a diagrammatic cross-sectional view of a steel cord for a pneumatic radial tire embodying the invention, showing a large diameter portion of the cord.
Figure 1B:
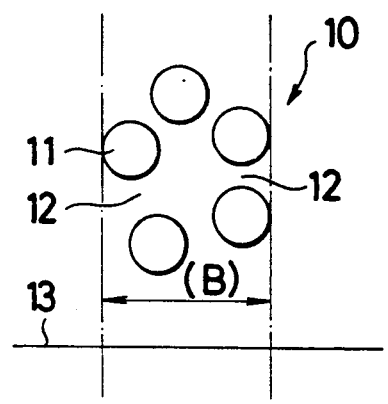
FIG. 1b is a view similar to FIG. 1a but showing a small diameter portion of the cord.
Figure 2A:
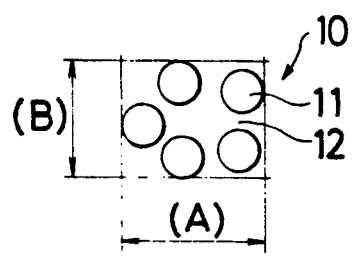
FIGS. 2a–2d, inclusive, are diagrammatic views of steel cords having different filament orientations as cross-sectionally observed.
Figure 2B:
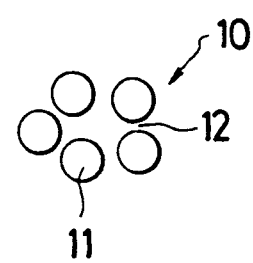
Figure 2C:
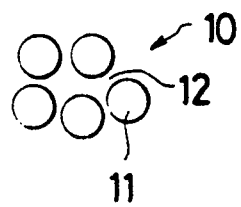
Figure 2D:
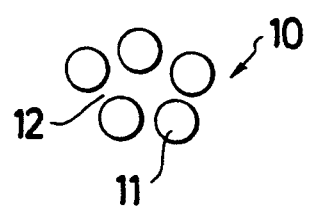
Figure 3:
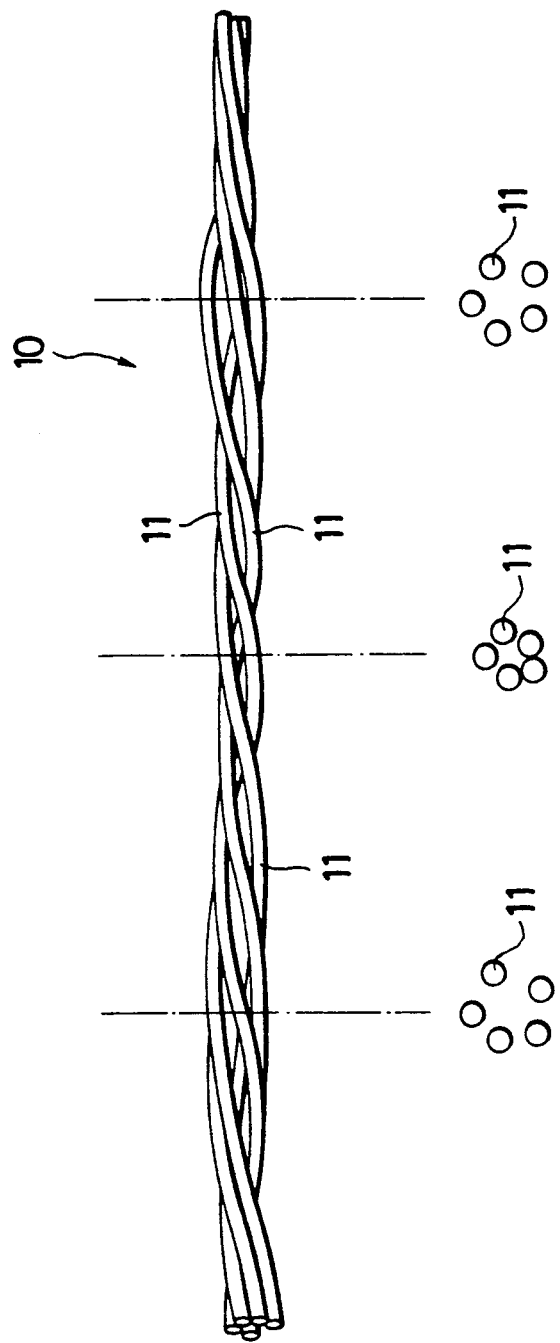
FIG. 3 is a plan view of a prior art steel cord.

According to an important aspect of the invention, starting filaments 11 are compressed as by a roller into a generally oblong cross-sectional configuration prior to coating with and vulcanization of a rubber coating in a tire so that the resulting cord 10 has a wide or maximum diameter portion (A) horizontally of the cord and a narrow or minimum diameter portion (B) vertically of the cord, as measured by projection onto a plane 13 parallel to the length of the cord 10 as shown in FIGS. 1 and 2. The ratio of (B)/(A) is in the range of 0.65–0.87 which should be maintained uniformly throughout the length of the cord 10 regardless of the varied orientations of the filaments shown in FIGS. 2a–2d. Ratios smaller than 0.65 would lead to increased strain in the vicinity of the ends of the long diameter portion (A) when the cord 10 is subjected to bending stress in cross sections including the long diameter portions (A). Ratios greater than 0.87 would produce nearly conventional open-twisted cords whose constituent filaments are liable to move during vulcanization, which would in turn result in diameter irregularities over the length of the cord. Thus, departures from the above specified ratios of (B)/(A) would reduce durability of the cord. Reducing the openess of twisted filaments may be conducive to maintaining the cord diameters uniform longitudinally of the cord, but would adversely affect the penetration of rubber in between adjacent filaments.

According to another important aspect of the invention, the steel filaments 11 are isolated or spaced one from another when they are embedded in rubber and finished into a composite reinforcement. This can be ascertained by the presence of rubber material in the interstices or spaces 12 between adjacent filaments 11.

By thus retaining the individual filaments 11 in mutually spaced-apart relation, it is rendered possible to allow the rubber to flow into and fill up the interstices 12 between adjacent filaments 11 as desired to provide corrosion-free or anti-rusting properties. Furthermore, being held out of contact with one another, the steel filaments 11 are free from fretting or abrasive wear.

There advantages accrue from conditioning a starting cord 10 prior to embedding it in a coating rubber so that the cord 10 is flattened out to have a diameter ratio (B)/(A) of 0.65–0.87. This is done by crushing the twisted filament cord to plastically deform it into a flat strip in which the filaments are held at least in part in contact with each other contrary to conventional cords. Known open-twisted cords having regions at which the filaments are completely isolated from one another have a drawback in that the filaments are apt to move under the influence of tensile or shearing stresses applied to the cord during vulcanization and come into contact with each other by failure to overcome the pressure of flowing rubber material. Whereas, the cord 10 according to the invention is flattened out at least with part of the filaments 11 held in mutual contact so as to inhibit objectionable movement of the filaments 11. When the flat cord 10 is covered with a rubber coating and vulcanized in a tire, the rubber material forces apart and fills up even those filament interstices which have been closed by some mutually engaged filaments so that the resulting cord in its final form has its constituent filaments 11 embedded in the rubber coat in completely isolated or spaced-apart relation to one another.

Preferably, each individual steel filament is twisted on its axis to provide increased interstices between adjacent filaments thereby ensuring permeation and fixation of the rubber material.

The specified diameter ratio of (B)/(A) of the cord may be checked by measuring a sample cord of the product tire or by means of parallel X-ray projection.

EXAMPLE

Ten different pneumatic radial tires Nos. 1–10 each of size 195/70 R14 having two steel corded belt layers with 10 mm twisting pitch were mounted on a test car and were inflated to an air pressure of 2 $kg/cm^2$. The car was run on a paved road for a total travel distance of 60,000 kilometers. Each tire had been initially provided with a hole in the tread at two different places reaching the belt layers so as to facilitate penetration of water into the tire on travel. The belt layers were checked for failures with the results listed in the table in which rubber permeation in the steel cords is represented in percentage by the ratio of the length of filament-to-filament spacing to the length of filaments completely covered with rubber, and the length of the cord rusted is measured from the tip end of each hole.

TABLE

|  | Tire No. | | | | | | | | | |
|---|---|---|---|---|---|---|---|---|---|---|
|  | 1 | 2 | 3 | 4 | 5 | 6 | 7 | 8 | 9 | 10 |
| Cord | 1 × 5 × 0.25 | 1 × 5 × 0.25 | 1 × 5 × 0.25 | 1 × 5 × 0.25 | 1 × 5 × 0.25 | 1 × 5 × 0.25 | 1 × 5 × 0.25 | 1 × 4 × 0.25 | 1 × 4 × 0.25 | 1 × 4 × 0.25 |
| (B)/(A) | 1.0 | 0.95 | 0.75 | 0.80 | 0.68 | 0.60 | 0.90 | 0.95 | 0.60 | 0.75 |
| Rubber permeation | 0 | 80 | 100 | 100 | 100 | 100 | 90 | 20 | 100 | 100 |
| Rust length | 150 | 15 | 5 | 5 | 5 | 5 | 10 | 120 | 5 | 5 |
| Cord breakage | no | yes | no | no | no | yes | yes | yes | yes | no |

Note:
Tire No. 1 is a conventional closed-twist cord.
Tire No. 2 is a conventional open-twist cord.
Tire Nos. 3, 4, 5 and 10 are products of the invention.
Tire Nos. 6, 7, 8 and 9 are controls.

What is claimed is:

1. In a pneumatic radial tire for motor vehicles containing a steel cord/rubber composite reinforcement structure, wherein said steel cord of the composite reinforcement structure comprises a plurality of intertwisted steel filaments arranged in spaced-apart relation to one another and embedded in the rubber of the structure so that the rubber is present in the spaces between the filaments, the improvement wherein the cord consisting of the plurality of intertwisted steel filaments before it is embedded in the rubber of the composite structure is first crushed to plastically deform the filaments in it and form a flat strip having a flat, oblong cross-sectional configuration in which at least a part of the filaments are in contact with each each other, the orientation and dimensions of the cross-sectional configuration of said flat strip following crushing being substantially uniform throughout the cord's length, with the ratio of the smaller dimension of the flat strip to its larger dimension being in the range of from 0.65–0.87.

2. The tire of claim 1, wherein said composite reinforcement structure is an annular reinforcement belt layer of rubber containing a plurality of said flat steel cords embedded therein.

3. The tire of claim 2, including from 3 to 5 steel filaments per cord.

* * * * *